(12) United States Patent  
Ikeda et al.

(10) Patent No.: US 6,308,000 B1
(45) Date of Patent: Oct. 23, 2001

(54) TELECOMMUNICATION DEVICE HAVING SUPPORT MEMBER FOR HOLDING OPTICAL FIBER

(75) Inventors: Mikiko Ikeda; Hiroshi Kasai, both of Kanagawa pref. (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/422,648

(22) Filed: Oct. 22, 1999

(30) Foreign Application Priority Data

Nov. 30, 1998 (JP) .................................... 10-339318

(51) Int. Cl.$^7$ ...................................................... G02B 6/00
(52) U.S. Cl. ............................................. 385/137; 385/136
(58) Field of Search ........................... 385/137, 134–139, 385/69, 86

(56) References Cited

U.S. PATENT DOCUMENTS 5,530,787 * 6/1996 Arnett ................................... 385/137

* cited by examiner

*Primary Examiner*—Phan T. H. Palmer
(74) *Attorney, Agent, or Firm*—Junichi Mimura

(57) ABSTRACT

A telecommunication device includes a support member, a board and container for containing an optical fiber. A support member formed of an elastic material, has an upper guide, a lower guide and a body. The bottom guide has a connecting pin. The support member is formed in a single integral structure, and is fabricated independently. The board having holes for the connecting pin is disposed in the container. The support member is fixed on the board by inserting the pin into one of the holes.

15 Claims, 5 Drawing Sheets

TELECOMMUNICATION DEVICE HAVING SUPPORT MEMBER FOR HOLDING OPTICAL FIBER

CROSS-REFERENCE TO RELATED APPLICATION

This application claims the priority benefit of Japanese Patent Application No. 10-339318, filed Nov. 30, 1998, the entire subject matter of which is incorporated herein of reference.

BACKGROUND OF THE INVENTION

1. Field of the Invention

The invention relates to a telecommunication device, and more particularly to an optical transmission device having a support member for holding an optical fiber.

2. Description of the Related Art

In an optical data transmission system, an optical fiber is used as a transmission medium. Generally, an UV resin coated optical fiber having 0.25 mm diameter is used in a telecommunication device in this field. As the optical fiber is formed of glass, scrupulous care should be taken in handling it. Due to this requirement, a support member is used in a telecommunication device for winding and holding the optical fiber in a suitable condition when the optical fiber is retained in a container of the telecommunication device. In the related art, the support member and the container are molded into a single integral structure.

However, as the support member and the container of the telecommunication device are formed into the single integral structure using a mold, it is required to change the design of the entire mold even if only the container's shape is changed and the support member's shape is not necessary to change at all. Therefore, the cost performance is not effective.

Further, in such a structures, the guides on the support member are required to prevent the optical fiber from getting out of the support member. However, this complicates the support member's shape and it is not so easy to form a support member with a complicated shape in the single integral structure with the container.

SUMMARY OF THE INVENTION

It is an object of the invention to provide an improved optical telecommunication device having a support member for an optical fiber in a container, that corrects the problems mentioned above. To achieve this object, in accordance with one aspect of the invention, the support member is formed independently from the other parts. In accordance with a second aspect of the invention, the support member is formed of elastic material, and in accordance with a third aspect of the invention, the upper guide of the support member is inclined.

BRIEF DESCRIPTION OF THE DRAWINGS

The invention will be more particularly described with reference to the accompanying drawings, in which.

DETAILED DESCRIPTION OF THE PREFERRED EMBODIMENT

Figure 1A:
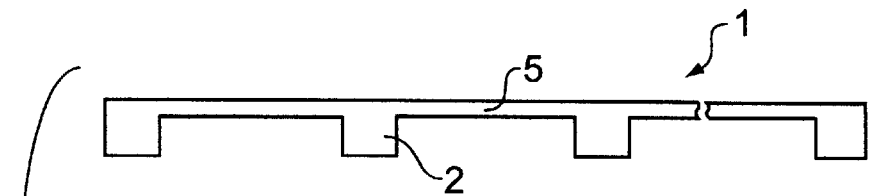
FIG. 1A is a top view of a support member for carrying out the invention.
Figure 1B:
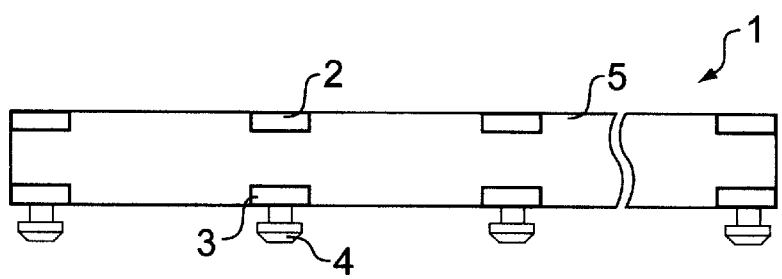
FIG. 1B is a side view of the support member.
Figure 1C:
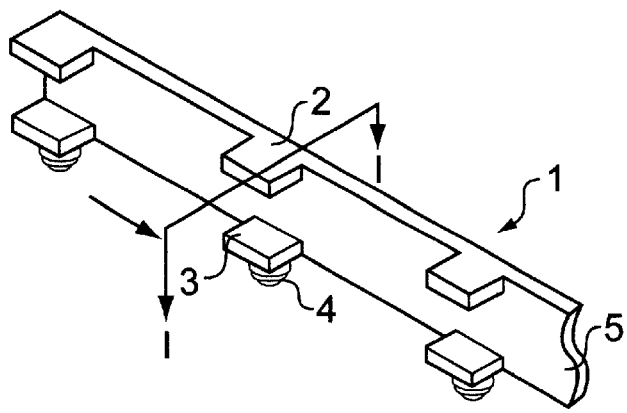
FIG. 1C is a prospective view of the support member.
Figure 1D:
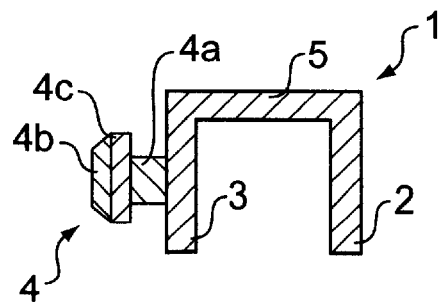
FIG. 1D is a cross-sectional view taken on line I—I of FIG. 1C.

Referring FIGS. 1A through 1D, a support member 1 for an optical fiber is formed of a flexible elastic material, such as silicon rubber having a hardness of 70 IRHD. The support member 1 is formed in the shape shown in FIGS. 1A through 1D. That is, the support member 1 is molded in a line, and then, the support member 1 is cut in a desired length and bent at a desired location when the support member is fixed to a container of a telecommunication device. The support member 1 includes multiple upper guides 2 for preventing the optical fiber from getting out of the support member, multiple lower guides 3, multiple connection pins 4 which is formed under the lower guide 3, and a body 5. The upper guides 2, the lower guides 3, the connection pins 4 and the body 5 form a single integral structure. Each upper guide 2 is rectangular, and is formed on one side of the body at a 90 degree angle thereto. Each guides 3 also is rectangular, and is formed on the other side of the body in parallel to the upper guides 2. Each connection pin 4 is formed on each of the guide 3. The connection pin 4 includes a small diameter cylindrical base part 4a, a frustum-shaped end part 4b, and a large diameter cylindrical part 4c between the base part 4a and the end part 4b acting as a stopper. Preferably, a size of a plane surface of the part 4c is substantially same as a size of a large plane surface of the end part 4b as shown in FIG. 1D, particularly. The support member 1 is fixed to the container by first inserting the connection pin 4 into a hole formed in a board, and attaching the board to the container. Once the support member 1 is fixed to the board, the support member 1 is not easily pulled out from the board because the support member 1 is hooked at the board by the large diameter cylindrical part 4c of the connection pin 4. Since the support member is elastic, it can bend to along with the holes in the board. That is, the support member can be coupled to any kind of the board having holes even if the board or container is re-designed.

Further, it is effective to form a large number of guides 2, 3 to reduce the possibility of getting the fiber out of the container. On the other hand, it is not so easy to put the optical fiber in the container if there are many guides formed of the relatively hard material. However, in this embodiment, the large number of the guides 2, 3 can be formed because they are formed of the elastic material. Therefore, it is easy to put the fiber in the container by bending the guide easily even if there are many guides.

According to the invention, as the support member 1 is formed in the shape illustrated in FIGS. 1A through 1D, it is relatively easy to mold the support member because of its simple structure. Further, as the support member 1 has guides 2 which are spaced with a predetermined distance, the optical fiber is prevented from getting out of the support member. Furthermore, it is easy to put the optical fiber in the container by bending the upper guide 2. Further, if the optical fiber receives an impact, the support member 1 can absorb the impact because of its elasticity. Therefore, if the optical fiber is tightly wound around the support member 1, the optical fiber will not snap because the support member 1 absorbs a stress applied to the optical fiber.

Figure 2A:
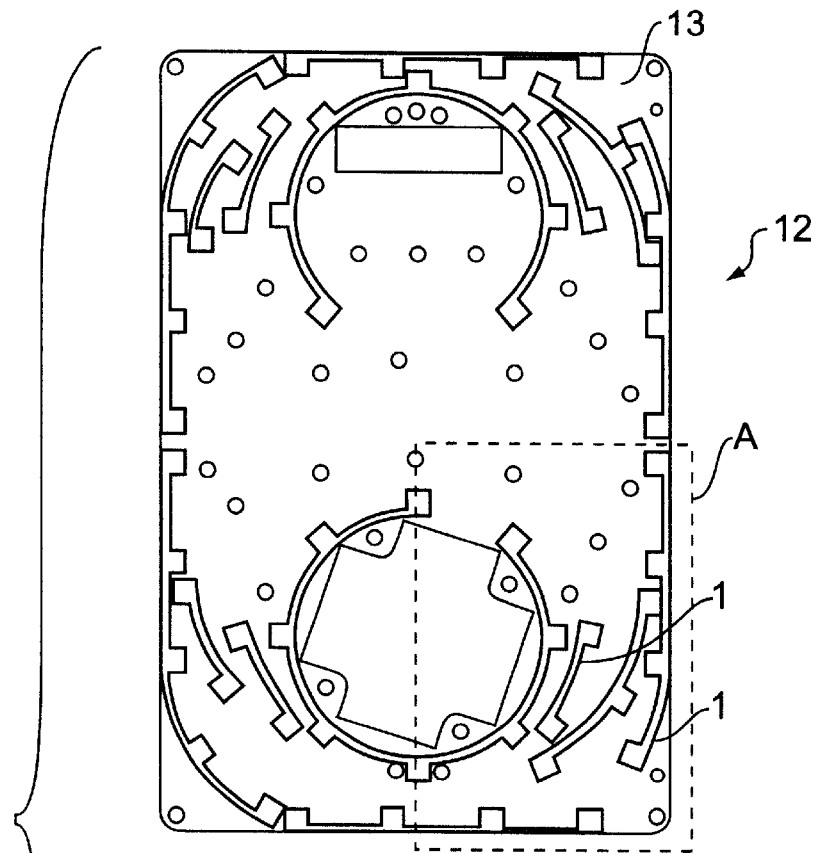
FIG. 2A is a top view of a container in which the support member is used.
Figure 2B:
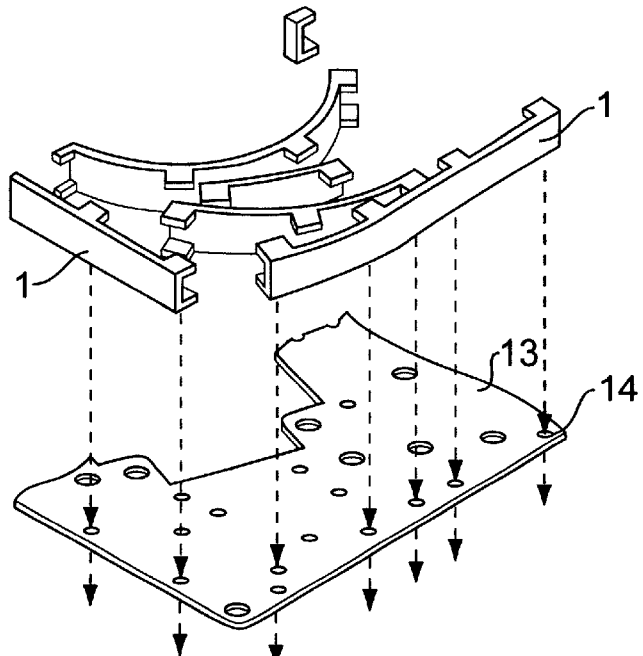
FIG. 2B is an enlarged detail prospective view of an area A of FIG. 2A.

Referring to FIGS. 2A and 2B, the support member 1 is fixed to the a board 13 having holes 14 for connecting the support member 1, and the board 13 is attached to the container 12. The support member 1, which is formed in a line, is cut to a desired length, and the connection pins 4 are inserted into the hole 14 of the board 13 to fix the support member 1. As many holes are formed in the board 13, the support member 1 can be fixed at any desired location by bending it. That is, since the support member 1 is formed of the elastic material, it is easy to change its shape by bending its body 5. The space between the support members is adjusted in response to the amount of the fiber to be contained.

Figure 3:
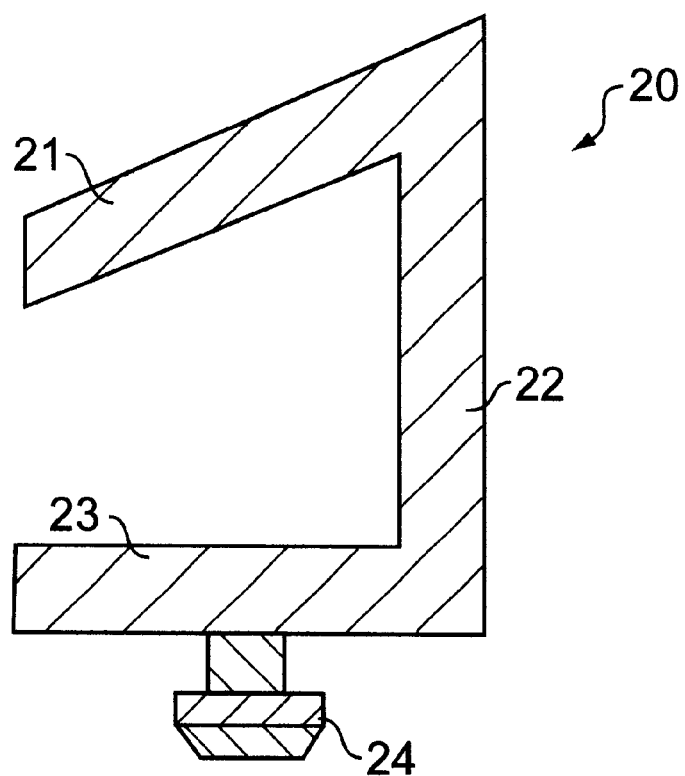
FIG. 3 is a cross-sectional view of an alternative support member.

Referring to FIG. 3, an alternative support member 20 includes upper guides 21 which are inclined 30 degree to 45 degrees. Each inclined guide is disposed in a predetermined space. The upper guides 21 are formed with other parts, such as a body 22, some lower guides 23 and some connection pins 24 in a single integral structure. The alternative support member 20 is attached to the container in the same way which as the support member 1 of the first embodiment.

According to this embodiment of this invention, the inclined guide 21 further prevents the optical fiber from getting out of the support member 20 because the of the inclined upper guides 21.

Figure 4:
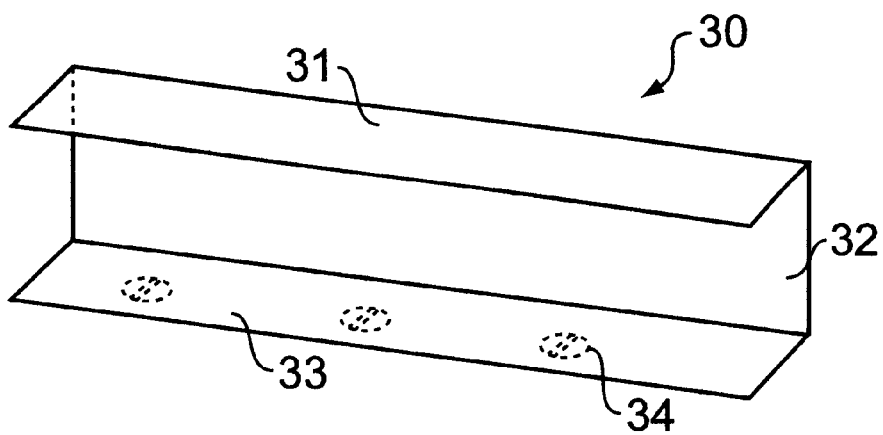
FIG. 4 is a prospective view of another alternative support member.

Referring to FIG. 4, another alternative support member 30 of the invention includes a single upper guide 31 which is perpendicular to a body 32 and a single lower guide 33 disposed in parallel to the single upper guide 31. The single upper guide 31 and the single lower guide 33 and the body 32 are formed in a single integral structure. As this is the simplest structure among the embodiments of this invention, it is easiest to form molding. Some split pins 34 can be attached to the single lower guide 33 after the support member 30 is formed. Alternatively, a support member having split pins can be form in a single integral structure if the split pins 34 also are set in the mold. When the support member 30 is used by bending, the single upper guide 31 and the single lower guide 33 can be cut at any locations where they are bent.

According to this embodiment of the invention, the surface area of the upper guide 31 is larger than in the other described embodiments, and thus further prevents the optical fiber from getting out of the support member.

Figure 5A:
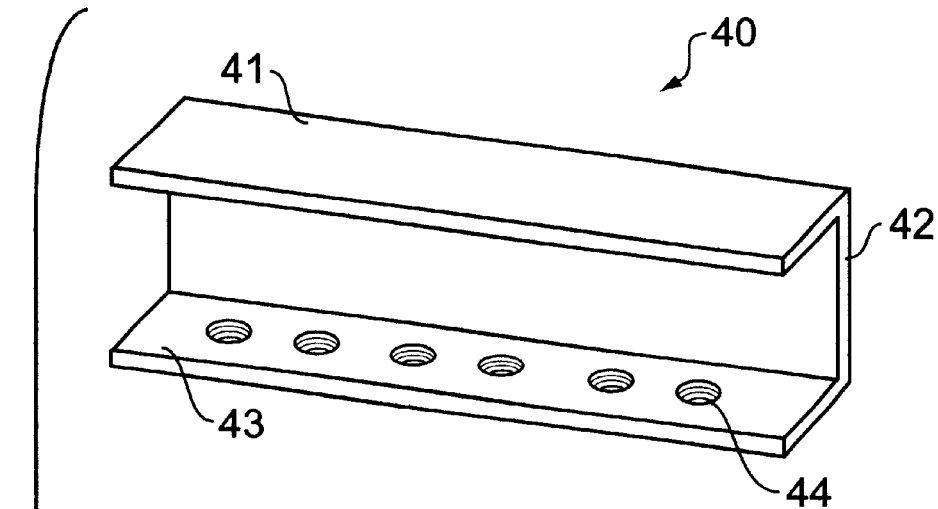
FIG. 5A is a prospective view of another alternative support member.
Figure 5B:
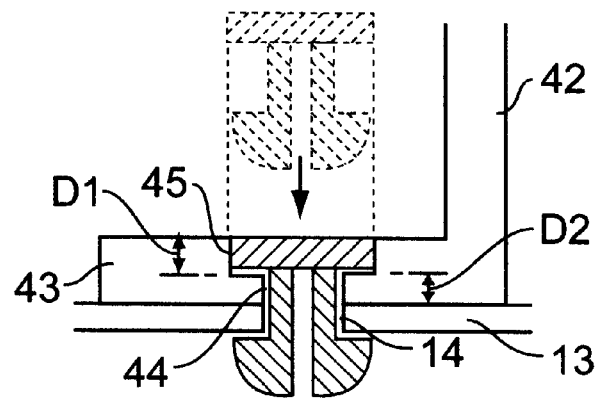
FIG. 5B is a sectional view when the support member shown in FIG. 5A is fixed to a board.
Figure 5C:
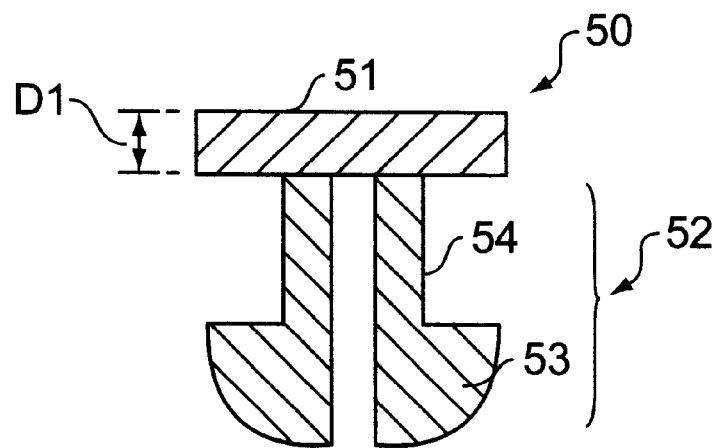
FIG. 5C is a sectional view of a split pin.
Figure 5D:
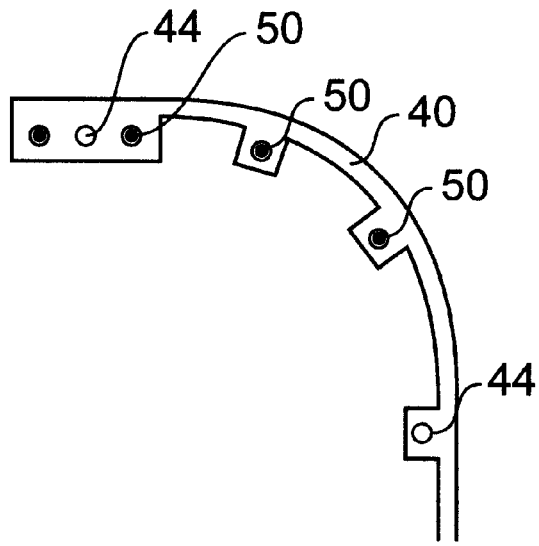
FIG. 5D is an illustration explaining how to use the support member shown in FIG. 5A with the split pins.

Referring to FIGS. 5A through 5D, another alternative support member 40 of the invention includes a single upper guide 41 which is perpendicular to a body 42 and a single lower guide 43 disposed in parallel to the single upper guide 41. The single upper guide 41 and the single lower guide 43 and the body 42 are formed in a single integral structure. The lower guide has a many holes 44. The holes are formed as many as possible, and each hole is disposed as closely as possible. Each hole 44 consists of a large diameter hole area 45 having a depth d1 and a small diameter hole area 46 having a depth d2. As shown in FIG. 5B, the support member 40 is fixed to the board 13 by inserting split pins 50, which are independently formed, in the holes 44 of the lower guide 43 and the holes 14 of the board 13. The split pin 50 shown in FIG. 5C includes a stopper part 51 having a thickness d1 and an inserting part 52 having a head part 53 and a shank part 54. The diameter of the stopper part 51 is equal to or smaller than the diameter of the hole 45. A length of a shank part 54 is equal to the total of the depth d2 and the thickness of the board 13. When the support member 40 is used by bending, the single upper guide 41 and the single lower guide 43 can be cut at any locations where they are bent, as shown in FIG. 5D. It is not necessary to insert the split pins 50 in all holes 44 of the lower guide 43 to fix the support member 40 to the board 13. As shown in FIG. 5D, it is enough to insert the pins 50 in the holes 44.

According to this embodiment of the invention, as the split pins are formed independently from the other, a user can bend the support member in any form. Further, the user can select a pin location.

While the present invention has been described with reference to illustrative embodiments, this description is not intended to be construed in a limiting sense. For example, the single upper guide 31 of the third embodiment can be inclined. Further, the connection pins 4 and 24 respectively of the first and second embodiments can be used for the third embodiment instead of the split pins 34. Of cause, the split pin can be used in the first and second embodiments. Furthermore, a connecting pin formed of the same material of the other parts, such as guides 31, 33 can be used in the third embodiment shown in FIG. 4. In this case, all parts including the single upper guide 31, the single lower guide 33, the body 32 and the connecting pin can be formed in a single integral structure. Various other modifications of the illustrated embodiments, as well as other embodiments of the invention, will be apparent to those skilled in the art on reference to this description. It is therefore contemplated that the appended claims will cover any such modifications or embodiments as falls within the true scope of the invention.

What is claimed is:

1. A support member for an optical fiber used in a telecommunication device, comprising:
   a body having a face;
   a plurality of laterally spaced apart upper guides formed at an upper side of said face of said body;
   a plurality of laterally spaced apart lower guides formed at a lower side of said face of said body; and
   a plurality of connecting pins, respectively formed on said lower guides,
   wherein said body, said upper guides, said lower guides and connecting pins are formed of an elastic material as a single integral structure.

2. A support member for an optical fiber used in a telecommunication device as claimed in claim 1, wherein said upper guides extend perpendicularly from said face of said body and said lower guides extend from said face in parallel to said upper guides.

3. A support member for an optical fiber used in a telecommunication device as claimed in claim 1, wherein said elastic material is silicon rubber.

4. A support member for an optical fiber used in a telecommunication device as claimed in claim 1, wherein each connecting pin includes a small diameter cylinder part connected to said lower guide, a frustum-shaped part and a large diameter cylinder part between said small diameter cylinder part and said frustum-shaped part.

5. A support member for an optical fiber used in a telecommunication device as claimed in claim 1, wherein said upper guides are inclined to said face.

6. A support member for an optical fiber used in a telecommunication device as claimed in claim 5, wherein the inclination of said upper guides is an angle of between 30 degrees and 45 degrees.

7. A support member for an optical fiber used in a telecommunication device comprising:

a body having a face;

a single upper guide being formed at an upper side of said face of said body;

a single lower guide being formed at a lower side of said face of said body; and a plurality of connecting pins, respectively formed on said lower guide, wherein said body, said single upper guide and said single lower guide are formed of an elastic material in a single integral structure.

8. A support member for an optical fiber used in a telecommunication device as claimed in claim 7, wherein said connecting pin is a split pin.

9. A support member for an optical fiber used in a telecommunication device as claimed in claim 7, wherein said connecting pin includes a small diameter cylinder part connected to said lower guide, a frustum-shaped part and a large diameter cylinder part between said small diameter cylinder part and said frustum-shaped part.

10. A support member for an optical fiber used in a telecommunication device as claimed in claim 9, wherein said connecting pins are formed of the same material of said body, said single upper guide and said single lower guide to make a single integral structure.

11. A telecommunication device using an optical fiber as the transmitting means, comprising:

a container means which is coupled to said telecommunication device, for containing said optical fiber;

a board having holes, said board being disposing in said container; and a support member including a body having a face, a plurality of laterally spaced apart upper guides formed at an upper side of said face of said body, a plurality of laterally spaced apart lower guides formed at a lower side of said face of said body, and a plurality of connecting pins, respectively formed on said lower guides, said support member being coupled to said board by inserting said connecting pins into said holes of said board, wherein said support member is formed of an elastic material in a single integral structure, and is fabricated independently.

12. A support member for an optical fiber used in a telecommunication device having a board that fixed to a container comprising:

a body having a face;

a single upper guide being formed at an upper side of said face of said body;

a single lower guide being formed at a lower side of said face of said body, said single lower guide having holes; and a plurality of connecting pins for coupling said single lower guide to said board by inserting in said holes, wherein said body, said single upper guide and said single lower guide are formed of an elastic material in a single integral structure.

13. A support member for an optical fiber used in a telecommunication device as claimed in claim 12, wherein said connecting pin is a split pin.

14. A support member for an optical fiber used in a telecommunication device as claimed in claim 13, wherein said split pin is formed of the same material of said body, said single upper guide and said single lower guide, and wherein said connecting pin is formed with said body, said single upper guide and said single lower guide in a single integral structure.

15. A support member for an optical fiber used in a telecommunication device as claimed in claim 12, wherein said connecting pin includes a stopper having a thickness, a head and a shank, wherein said each hole has a large diameter area and a small diameter area, and wherein the depth of said large diameter area is substantially the same as said thickness of said stopper.

* * * * *